United States Patent
Barry et al.

(10) Patent No.: US 6,433,903 B1
(45) Date of Patent: Aug. 13, 2002

(54) OPTICAL MANAGEMENT CHANNEL FOR WAVELENGTH DIVISION MULTIPLEXED SYSTEMS

(75) Inventors: Richard A. Barry, Brookline; Naimish Patel, North Andover, both of MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/475,298

(22) Filed: Dec. 29, 1999

(51) Int. Cl.[7] .................................................. H04J 14/02
(52) U.S. Cl. ........................................ 359/124; 359/127
(58) Field of Search ............................... 359/124, 127, 359/133, 161

(56) References Cited

U.S. PATENT DOCUMENTS

| | | | |
|---|---|---|---|
| 4,449,247 A | | 5/1984 | Waschka, Jr. .................. 455/9 |
| 4,451,916 A | | 5/1984 | Casper et al. .................. 370/16 |
| 5,038,140 A | | 8/1991 | Ikeuchi .................. 340/825.02 |
| 5,416,768 A | | 5/1995 | Jahromi ........................ 370/55 |
| 5,440,418 A | * | 8/1995 | Ishimura et al. ............. 359/177 |
| 5,463,671 A | | 10/1995 | Marsh et al. .................. 379/56 |
| 5,515,361 A | | 5/1996 | Li et al. ........................ 370/15 |
| 5,519,695 A | | 5/1996 | Purohit et al. ............. 370/58.2 |
| 5,606,664 A | | 2/1997 | Brown et al. ............ 395/200.1 |
| 5,745,269 A | | 4/1998 | Chawki et al. ............. 359/119 |
| 5,777,763 A | | 7/1998 | Tomlinson, III ............ 359/130 |
| 5,867,289 A | | 2/1999 | Gerstel et al. ............. 359/110 |
| 5,914,794 A | * | 6/1999 | Fee et al. .................... 359/110 |
| 5,935,209 A | | 8/1999 | Budhraja et al. ............ 709/223 |
| 5,956,165 A | * | 9/1999 | Fee et al. .................... 359/118 |
| 5,978,115 A | | 11/1999 | Condict et al. ............. 359/124 |
| 6,023,366 A | * | 2/2000 | Kinoshita .................... 359/341 |
| 6,031,644 A | * | 2/2000 | Utsumi ....................... 359/110 |
| 6,046,833 A | * | 4/2000 | Sharma et al. .............. 359/119 |
| 6,151,158 A | * | 11/2000 | Takeda et al. .............. 359/341 |
| 6,172,802 B1 | * | 1/2001 | d'Auria et al. ............. 359/341 |

OTHER PUBLICATIONS

Dutton, H., "Understanding Optical Communications", pp. 386–387, Prentice Hall PTR, 1998.

* cited by examiner

Primary Examiner—Leslie Pascal
Assistant Examiner—Dalzid Singh
(74) Attorney, Agent, or Firm—Lahive & Cockfield, LLP

(57) ABSTRACT

A wavelength-division multiplexed (WDM) system includes an optical communications link with one or more optical amplifiers cascaded from an input end to an output end. Each amplifier has a predetermined optical gain throughout a pass band, and passes optical signals in the pass band along the link. Transmitting optical communications equipment is coupled to the input end of the link and provides a WDM optical communications signal to the link. The WDM optical signal includes a number of spaced-apart optical signals, including data optical signals and at least one management optical signal, that reside in the pass band of the optical amplifiers. Receiving optical communications equipment coupled to the output end of the link receives the WDM optical communications signal, separates the management optical signal from the data optical signals, recovers management information from the separated management optical signal, and uses the recovered management information to carry out management functions. In one case, the management optical signal resides at an edge of the pass band of the optical amplifiers, for example at 1529.5 nm or 1561 nm in a system having optical amplifiers specified to operate from 1530 to 1560 nm.

12 Claims, 8 Drawing Sheets

OPTICAL MANAGEMENT CHANNEL FOR WAVELENGTH DIVISION MULTIPLEXED SYSTEMS

BACKGROUND OF THE INVENTION

The present invention is related to the field of network management for data communications systems employing Dense Wavelength-Division Multiplexed (DWDM) communications links.

Dense Wavelength Division Multiplexing (DWDM) is a technology which uses densely packed wavelengths of light to effectively multiply the capacity of an optical fiber. The capacity of these systems is generally limited by fiber loss, unless optical amplifiers are used. A widely-deployed optical amplifier is the Erbium Doped Fiber Amplifier (EDFA), which amplifies light signals within an extremely large frequency band (~4 THz for a conventional EDFA at present). Although this frequency range is large, it is relatively small compared with the total low-loss window of present optical fibers. Thus, the capacity of optical-amplified systems is generally limited by EDFA bandwidth. A typical conventional band, or C-band, EDFA operates in the range of about 1530 nm to about 1560 nm. Newer L-band EDFAs operate in the range of about 1570 nm to about 1600 nm. Other amplifier technologies such as Raman and semiconductor amplifiers may be used within the C and the L bands, as well as in other low loss regions of the fiber, e.g. ~1260 nm to ~1360nm, or in the ~1400 to ~1500 nm range (S-band) in newer fiber that lacks the well-known water absorption peak of traditional fiber.

A typical DWDM system employs a so-called Optical Supervisory Channel, or OSC, to provide communications among components in the DWDM system for purposes of operational control and monitoring. For example, it is necessary to monitor and control the output powers of the EDFAs in a system. An OSC typically takes the form of an optical signal of a given wavelength on each span of fiber in a link. At each amplifier node, the OSC is intercepted and converted to electrical form for local use. The electrical signals are also re-converted into optical form for transmission to the next amplifier node in the link.

It is widely known to use a so-called "out-of-band" OSC in DWDM systems. According to this scheme, the OSC uses a wavelength that is widely separated from the wavelengths used to carry user data traffic. For example, in a C-band system in which the EDFAs operate over the range of wavelengths from 1530 to 1560 nm, the OSC may be placed at a wavelength of 1310 nm. This arrangement satisfies several needs in DWDM systems. The OSC does not consume any optical amplifier bandwidth or power which could be utilized by data-carrying optical signals. Also, an out-of-band OSC is fairly easy to extract from the composite DWDM signal. Extraction can be done inexpensively, with low loss, and with high efficiency. The latter is important to prevent mutual interference between the DWDM data signals and the OSC. Also, the wavelength tolerance for an out-of-band OSC can be fairly loose, so that less accurate, and therefore less expensive, lasers may be used. For instance, an out-of-band OSC might use an uncooled distributed feedback laser (DFB) whose wavelength might drift as much as +/– 5 nm over temperature and life. Finally, an out-of-band OSC continues to operate if the optical amplification fails or degrades.

Nevertheless, out-of-band OSC channels also have drawbacks that make them unattractive from the perspective of the needs of a user's network management system. In many DWDM systems, the OSC is used for internal purposes and users are not given access to the OSC. Even when access is provided, there is no standardization of the communications protocols that are used for OSCs used by different vendors of DWDM systems. Any given OSC may use Ethernet, Internet Protocol (IP), HDLC, or other protocols, including proprietary protocols. The lack of standardization can create major complications when trying to interwork different OSCs and management channels. There can also be undesirable performance limitations if the amount of communications bandwidth required by a network management application exceeds the bandwidth provided by an OSC.

An example of a typical out-of-band OSC is shown in U.S. Pat. No. 5,914,794 of Fee et al., assigned at issuance to MCI Communications Corporation. In this patent, an OSC is transported on a 1510 nm wave, outside the traffic band of 1530–1560 nm. The OSC is terminated at every node, including each of several optical amplification stations. The terminated signal is converted to electrical form and processed by various elements, including a line supervisory module. Those messages intended for another node are included in an outgoing electrical signal which is converted to an optical signal and sent on the next optical "hop". The Fee patent suggests that the OSC can alternatively be carried in the traffic band, while presumably retaining the characteristic of being dropped, reconstituted, and added at every node in the optical network. Fee does not describe any problems or undesirable limitations that might exist in such an alternative implementation.

Aside from using an out-of-band OSC, there have been other approaches to providing a control channel in DWDM systems. One technique is referred to as an "in-channel" control channel, meaning that the control information is multiplexed in some manner with the data information. Variations of this technique include the use of overhead bytes in data frames; using a sub-carrier multiplexed tone on top of a data channel; and using code-division multiple access (CDMA) signals on top of a data channel. While these approaches can be useful in certain environments, they also suffer respective limitations. Overhead-based schemes do not work well in the context of "transparent" services, which by definition provide t no user access to frame overhead bytes. Both sub-carrier multiplexed tones and CDMA signals complicate transceiver design, tend to degrade data channel performance, and offer only limited bandwidth. Another general approach is to use an out-of-fiber control channel, for example by using an entirely separate Internet Protocol (IP) network connecting user equipment together for network management purposes. Aside from the cost and complexity issues, this approach cannot be used to communicate with equipment located in remote areas, such as equipment located at an isolated regenerator site. Also, the lack of in-fiber signalling complicates the function of topology discovery, which is necessary for the proper functioning of network routing algorithms and other operations.

BRIEF SUMMARY OF THE INVENTION

In accordance with the present invention, a wavelength-division multiplexed (WDM) system is disclosed that uses an in-fiber, in-band optical management channel (OMC). Many of the above-discussed drawbacks of other control channel architectures are avoided, so that users of the WDM system are able to create a comprehensive and robust network management system that can utilize substantial optical bandwidth to carry out its operations. Additionally, the OMC can be combined with a traditional OSC in a system in order to achieve additional benefits, including the ability to manage equipment in separate management "domains" that may exist in when the system includes equipment from different vendors.

The disclosed WDM system includes an optical communications link having cascaded optical amplifiers. Each optical amplifier has a pass band, throughout which the amplifier provides substantially a predetermined optical gain, so that each amplifier passes optical signals in the pass band along the optical communications link without interception. Transmitting optical communications equipment coupled to the input end of the link generates a WDM optical communications signal that includes a number of spaced-apart optical signals, including data optical signals and at least one management optical signal. The data optical signals and management optical signal occupy substantially the pass band of the optical amplifiers so as to be capable of passing through each amplifier to the output end of the link. Receiving optical communications equipment coupled to the output end of the optical communications link receives the WDM optical communications signal, separates the management optical signal from the data optical signals, recovers management information from the separated management optical signal, and uses the recovered management information to carry out management functions.

The in-band management optical signal passes through the optical amplifiers of the WDM system, and thus effectively carries end-to-end network management traffic. Moreover, the wavelength of the management optical signal is selected to minimize the impact on the user data signals. In a preferred embodiment, the management optical signal resides at an edge of the pass band of the optical amplifiers. For example, in a system having optical amplifiers specified to operate over the band from 1530 to 1560 nm, the management optical channel may be placed at 1529.5 or 1561 nm. A management optical channel placed in this manner generally receives less gain than the gain received by the data signals, and consequently may need to be operated at a lower data rate than the data channels. The higher-gain mid-band region is reserved for the data channels to maximize system data carrying capacity.

An in-fiber, in-band OMC can provide substantial bandwidth for use by a user's network management system, without significantly degrading the performance of the data channels. Route discovery and other topology-dependent functions can be carried out in a straightforward manner, even when optical links traverse isolated areas where no separate communications networks are supported. Also, as mentioned above, the OMC can be used along with an OSC to achieve additional benefits, such as managing equipment in multiple management domains.

Other aspects, features, and advantages of the present invention are disclosed in the detailed description that follows.

DETAILED DESCRIPTION OF THE INVENTION

Figure 1:
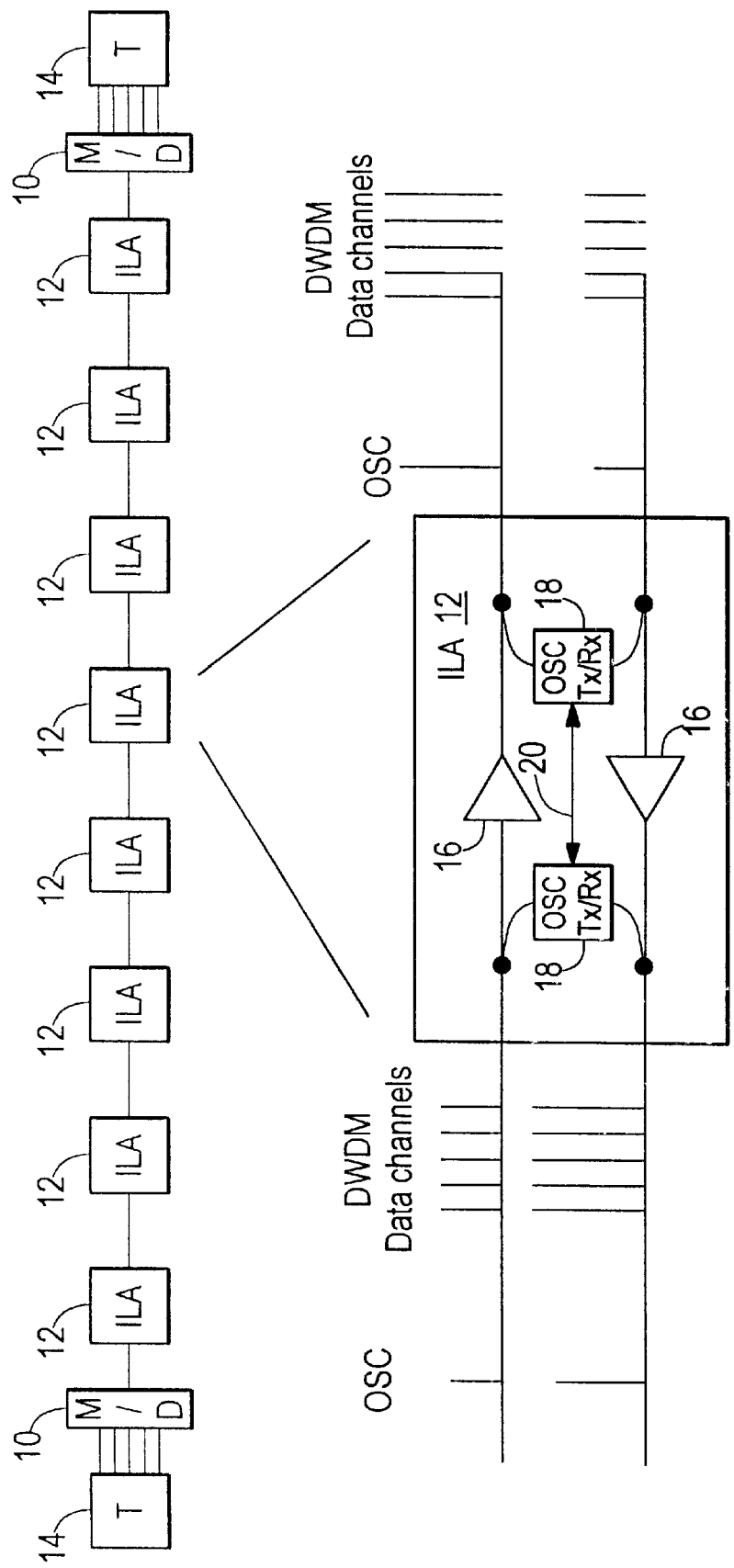
FIG. 1 is a block diagram of a dense wavelength-division multiplexed (DWDM) communications system as known in the prior art.

A portion of a typical commercial amplified DWDM communications system is shown in FIG. 1. The system includes a pair of WDM multiplexer/demultiplexers 10 at opposite ends of an optical link. The link may have between one and eight spans, or more, of optical fiber, with inline amplifier (ILA) nodes 12 providing intermediate optical amplification of the DWDM signal. Terminal equipment 14 sends and receives optical communications signals of various wavelengths to/from the multiplexers/demultiplexers 10 for transmission over, or reception from, the communications link. Although not shown in FIG. 1, it will be understood that a boost amplifier is generally used at the output of a multiplexer/demultiplexer 10 to drive the optical fiber, and a preamplifier is generally used at the input of a multiplexer/demultiplexer 10 to boost the optical signal received from the fiber before further processing is performed. Such boost amplifiers and preamplifiers generally have the same optical pass band as that of the ILA nodes 12.

As illustrated, each ILA node 12 includes at least two erbium-doped fiber amplifiers (EDFAs) 16, one for each direction. In some cases, two additional EDFAs (not shown) are used in order to allow mid-stage access between the EDFAs in each direction. Mid-stage access provides for convenient placement of additional elements, such as add/drop filters or dispersion compensation components (also not shown). The EDFAs may or may not be packaged as a single unit. Also as shown, each ILA node 12 includes a pair of Optical Supervisory Channel (OSC) transceivers 18, each interfacing with the fiber or fibers linking the ILA node 12 with a corresponding adjacent ILA node 12. An electrical communications path 20 between the OSC transceivers 18 is used to transfer messages between the OSC transceivers 18, for example to forward messages along the spans of the communications link in "hopping" fashion.

The OSC transceivers 18 operate to insert and extract an Optical Supervisory Channel (OSC) used to control the operation of the ILA nodes 12. In a common configuration shown in FIG. 1, the wavelength of the OSC is widely separated from the wavelengths of the DWDM data signals. For example, the EDFAs 16 may operate in the range of wavelengths from about 1530 nm to about 1560 nm, whereas the OSC signal has a wavelength of 1310 nm. OSC wavelengths of 1510 nm and 1625 nm have also been used. As mentioned above, this type of control channel is called an "in-fiber", "out-of-band" control channel, because the OSC is transmitted in the same fiber as the data signals but at a wavelength outside the pass band of the optical amplifiers 16. An out-of-band OSC is easily inserted and extracted from the composite WDM signal at each ILA node 12. Also, the OSC signal does not pass through the EDFAs 16, so that no power is robbed from the data signals. This configuration has been useful for managing optical components such as ILA nodes 12 in a WDM system.

Although not apparent from FIG. 1, the OSC is typically controlled and used entirely by the operator of the DWDM system, for purposes of internal operations rather than for providing higher-level user services, such as end-to-end network management services. For example, an OSC is typically used by a DWDM system operator to monitor signal power at an ILA node 12, and to adjust the output power or gain of each EDFA 16. Accordingly, DWDM systems typically have not provided a user interface to the OSC. As a result, users' network management needs are not explicitly supported by the DWDM system. And even where a user interface to an OSC is provided, there may be undesirable performance limitations. For example, the user equipment may require more bandwidth than the OSC can provide. Or it may be necessary to develop complicated software to adapt the user's equipment with a proprietary OSC interface. In some cases, the user may need to manage equipment that is not even in the same management domain as the DWDM system, and the OSC may not provide any support for the required cross-domain functions. This situation can arise when the user equipment and DWDM equipment are of different types, for example, or are manufactured by different vendors.

Figure 2:
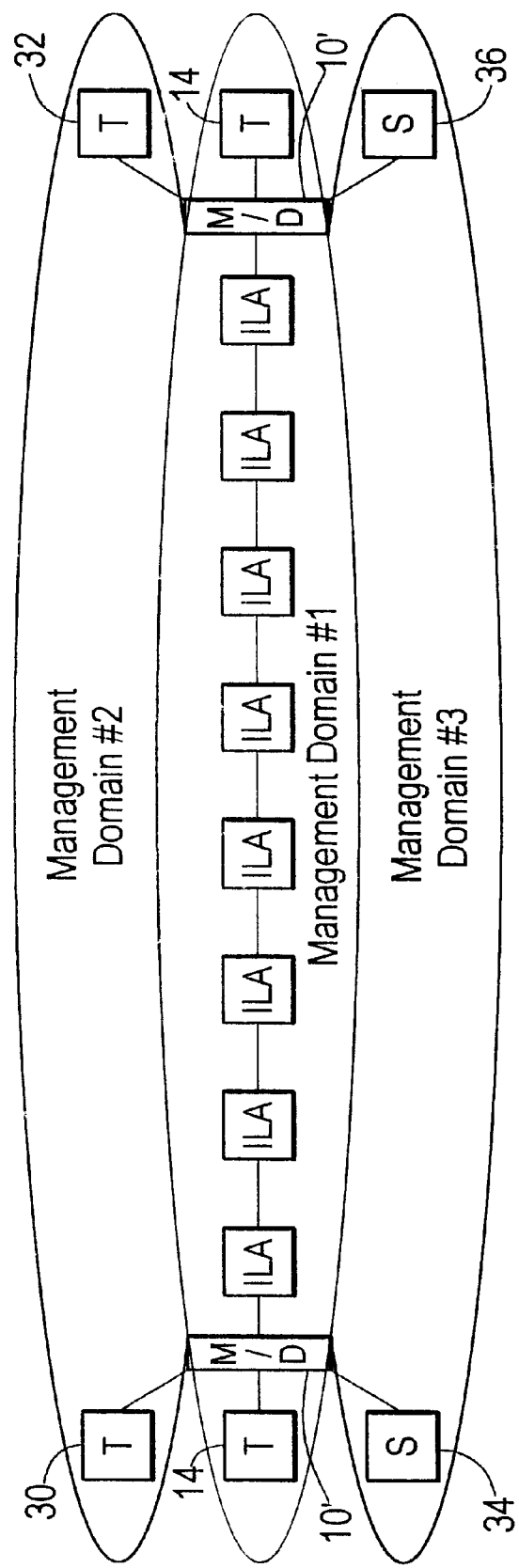
FIG. 2 is a block diagram of a first type of communications network employing a DWDM sub-network and operating according to the present invention.
Figure 3:
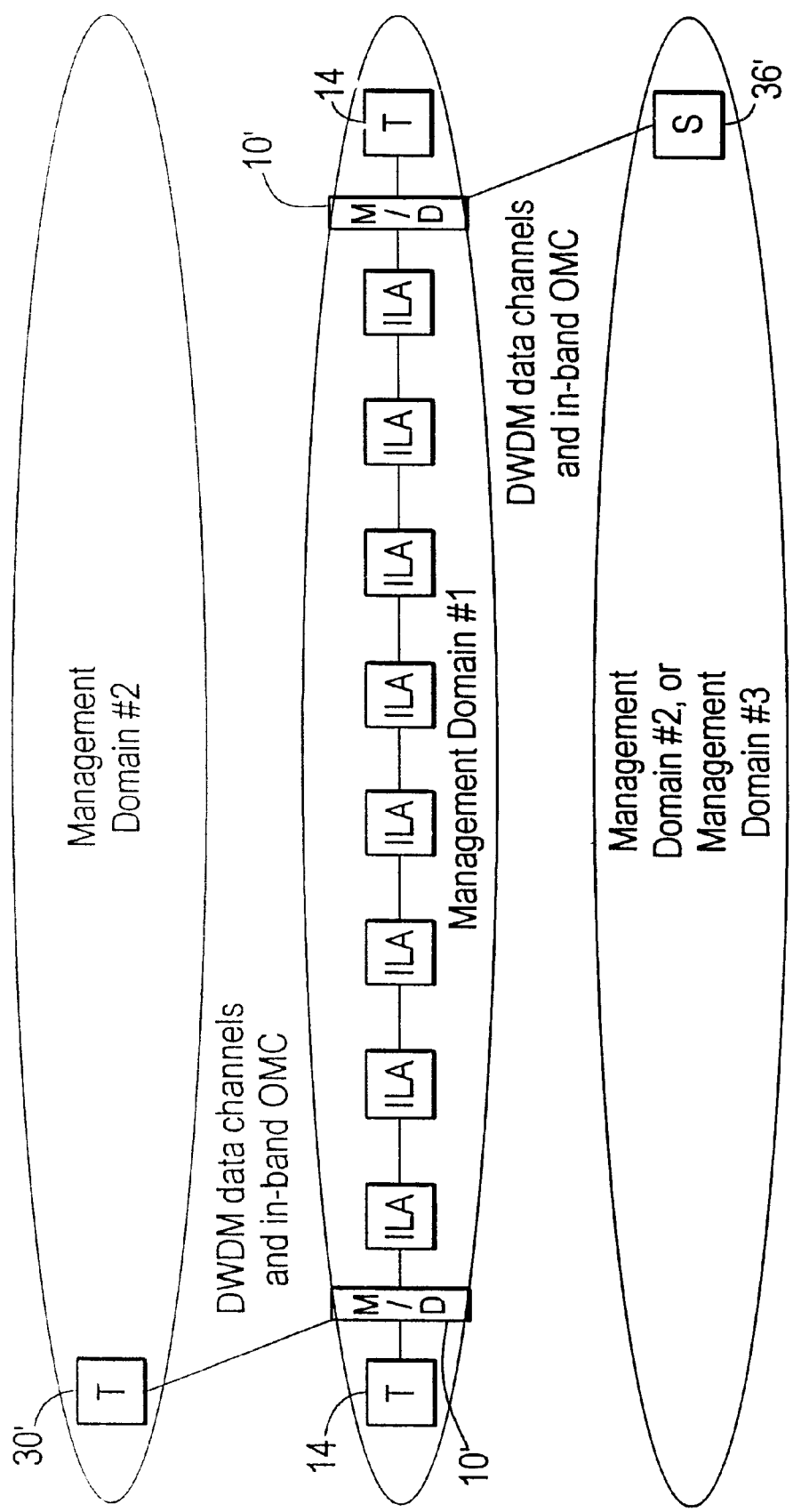
FIG. 3 is a block diagram of a second type of communications network employing a DWDM sub-network and operating according to the present invention.

FIGS. 2 and 3 illustrate different operational environments for which the traditional OSC is ill-suited to provide necessary functionality. In FIG. 2, the DWDM system itself is shown as Management Domain #1. Management Domain #2 includes user terminals ("T") 30 and 32, and Management Domain #3 includes switches ("S") 34 and 36. The devices 30, 32, 34 and 36 are assumed to be co-located with respective multiplexers/demultiplexers 10' of the DWDM system, but to fall outside the DWDM system management domain, Management Domain #1. Further, it is assumed that these devices include network management functionality imposed by the respective domain, either Management Domain #2 or Management domain #3. For example, the devices 30 and 32 in Management Domain #2 may be part of a virtual private network (VPN) operated by an organization, which operates in part over communications links in the DWDM system. Similarly, devices 34 and 36 may be part of another organization's VPN. Within each Management Domain #2 and #3, devices are required to communicate among themselves to share network management information. As described above, the DWDM system and OSC of FIG. 1 provide either no support or only limited support for such network management traffic. In particular, it would be necessary for Management Domains #2 and #3 to share the use of the OSC for their respective network management needs, a difficult requirement that could significantly complicate the design and operation of the respective interfaces.

FIG. 3 shows a slightly different network configuration, in which Management Domains #2 and/or #3 are more clearly separate from the DWDM system, which is represented as Management Domain #1. In the system of FIG. 2, specific pieces of equipment such as terminals 30 and 32 are managed separately from the other equipment of the DWDM system, which are part of Management Domain #1. The configuration of FIG. 3 takes this separateness a step further. Management Domains #2 and/or #3 can be seen as entirely separate entities that can include discrete pieces of equipment or may be whole networks or sub-networks. In particular, it may be that Management Domain #2, for example, is physically isolated from Management Domain #1 and perhaps from Management Domain #3 as well.

Thus, in systems such as those shown in FIG. 2 and FIG. 3, an in-band, in-fiber Optical Management Channel (OMC) is defined that enables the management of network domains that either include or cross over a DWDM system. The "in-band" OMC uses a wavelength in the same band as the DWDM user data signals, but which is not utilized by the DWDM system to carry user data. This wavelength may either be unusable by the DWDM system for carrying user data, or may simply be not designated for such use.

The OMC is carried on an optical signal having a tightly controlled wavelength, e.g. +/−0.1 nm or better, in order to avoid cross-talk with adjacent data channels. To further reduce cross-talk and/or non-linear effects on the fiber, the power of the OMC optical signal is deliberately kept as low as possible. This may necessitate the use of an optical receiver having greater sensitivity than the receivers used for the data channels. The OMC may be inserted and extracted either before or after optical amplifiers (not shown) at the various terminals 30, 32, 34, 36, etc. Various ways of performing insertion and extraction of the OMC are described below.

Figure 4:
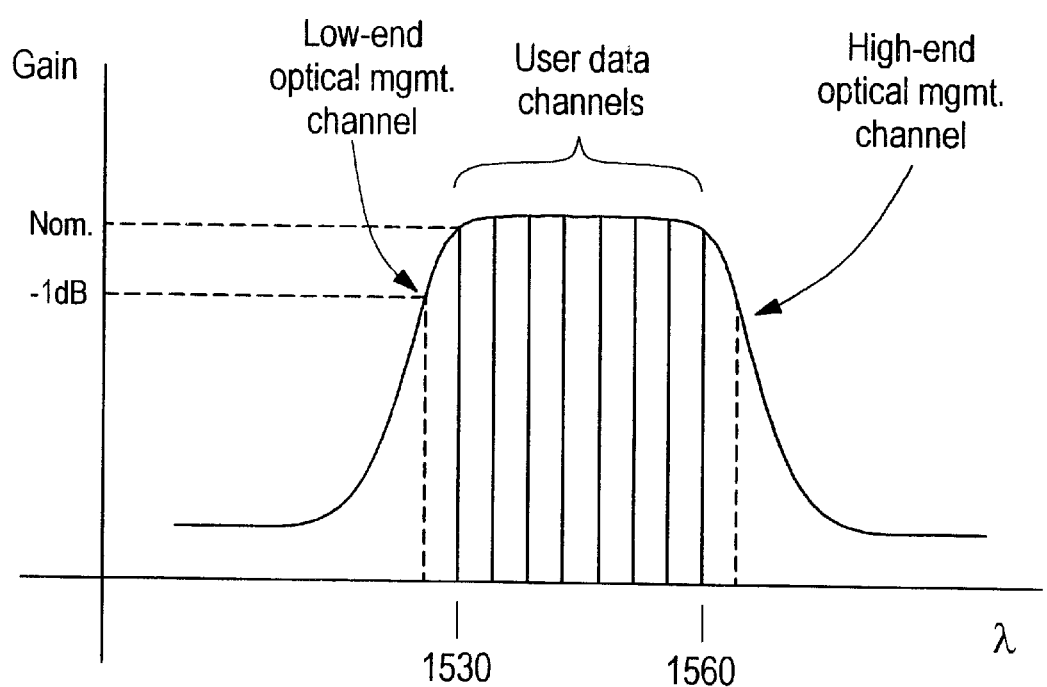
FIG. 4 is a plot of the optical spectrum of a DWDM signal and optical amplifier gain characteristics in a communications network like that of FIG. 2 or 3.

FIG. 4 illustrates a preferred OMC implementation. A wavelength is chosen for the OMC that is at the edge of the pass band of the EDFAs 16, in a region beyond that specified for use by the DWDM system. The pass band is defined, for example, by the wavelengths at which the amplifier gain drops by 1 dB from its mid-band value. For instance, consider a C-band system, in which the EDFAs 16 might be specified for use between 1530 nm and 1560 nm as shown. The wavelength for the OMC could be at the low end of the pass band, such as at 1529.5 nm, or at the high end, such as at 1561 nm. The EDFAs 16 do not provide as much gain in these edge regions as in the center of the pass band, and thus these marginal wavelengths are not useful for carrying data channels.

It should be noted that FIG. 4 is used to illustrate the placements of the OMC(s) and data signals with respect to the pass band of the optical amplifiers, and to show that OMCs at the edge of the pass band receive less gain than the mid-band data channels. FIG. 4 does not necessarily reflect the actual absolute power levels of these signals as would be observed at an optical amplifier in a DWDM system.

To achieve the desired tight control over the wavelength of the OMC, preferably a temperature controlled distributed feedback (DFB) laser or a wavelength-locked laser is used. Also, as previously mentioned it is preferable to use a sensitive transmitter/receiver pair to (1) keep the launched power low, so that a relatively small amount of amplifier power is used, and (2) enable the detection of the OMC signal even if the amplifier gain at the OMC wavelength is less than the span loss. Additionally, it may be desirable to reduce the data rate of the OMC and/or to employ forward error correction (FEC) coding, in order to further reduce power requirements. It may also be desirable to define multiple OMCs for use by different management domains.

Figure 5:
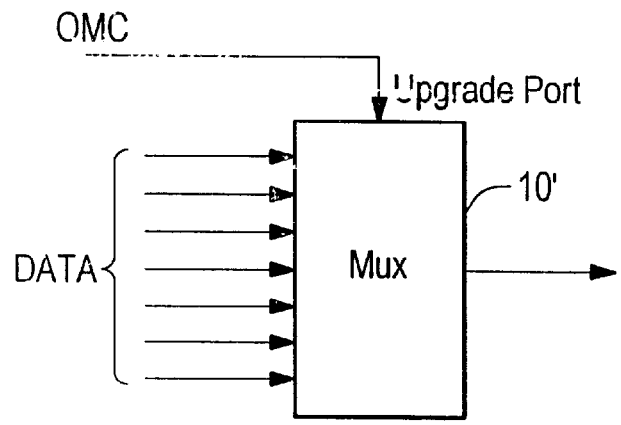
FIGS. 5 and 6 respectively show the addition and extraction of a single optical management channel (OMC) using an upgrade port of an optical multiplexer and demultiplexer.
Figure 6:
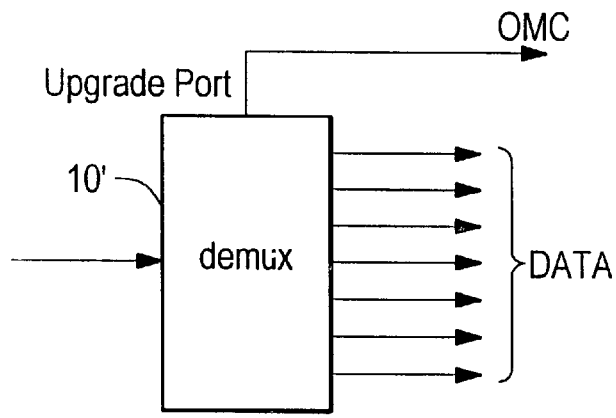
Figure 7:
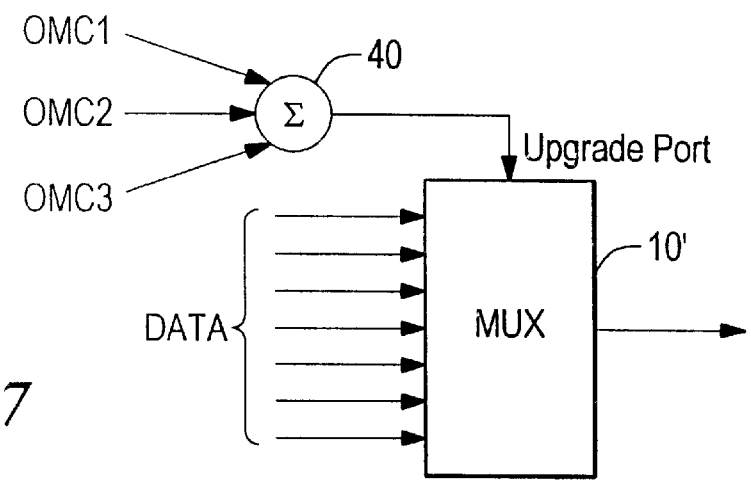
FIGS. 7 and 8 respectively show the addition and extraction of multiple OMCs using an upgrade port of an optical multiplexer and demultiplexer.
Figure 8:
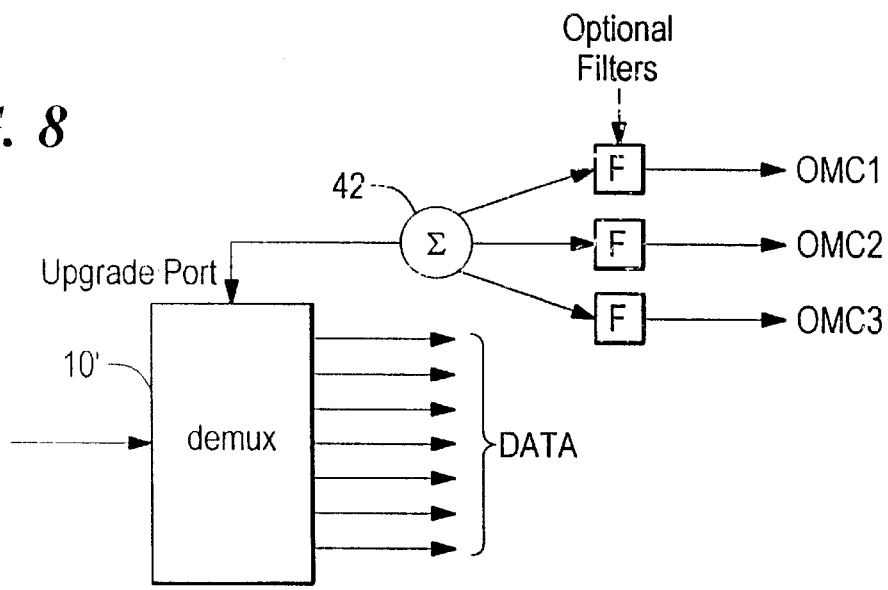
Figure 9:
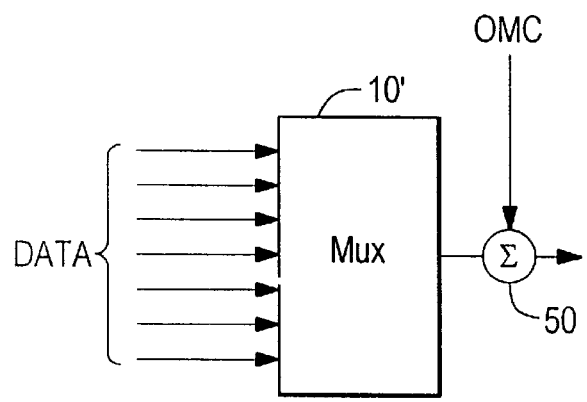
FIGS. 9 and 10 respectively show the addition and extraction of a single OMC using broadband couplers.
Figure 10:
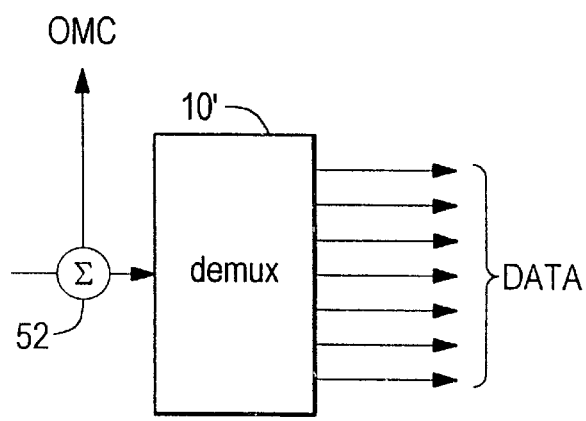
Figure 11:
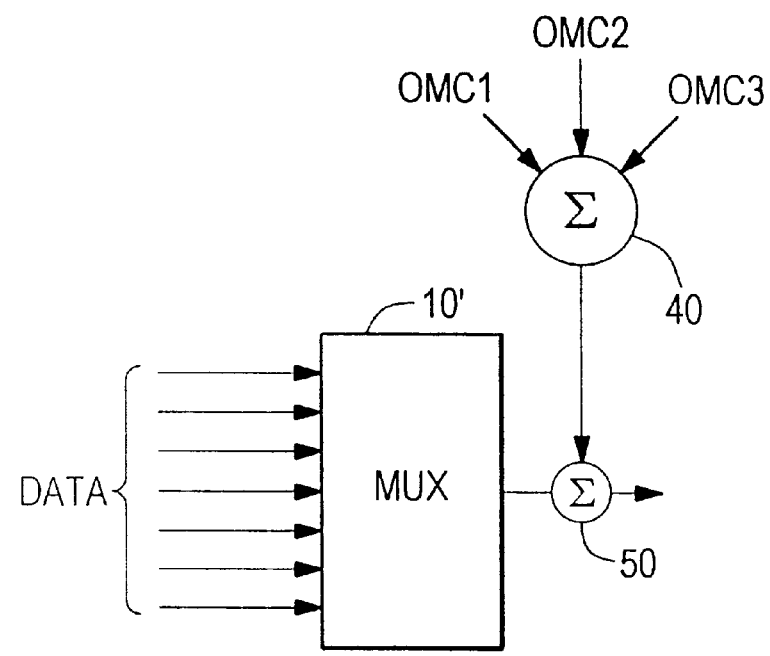
FIGS. 11 and 12 respectively show the addition and extraction of multiple OMCs using broadband couplers.
Figure 12:
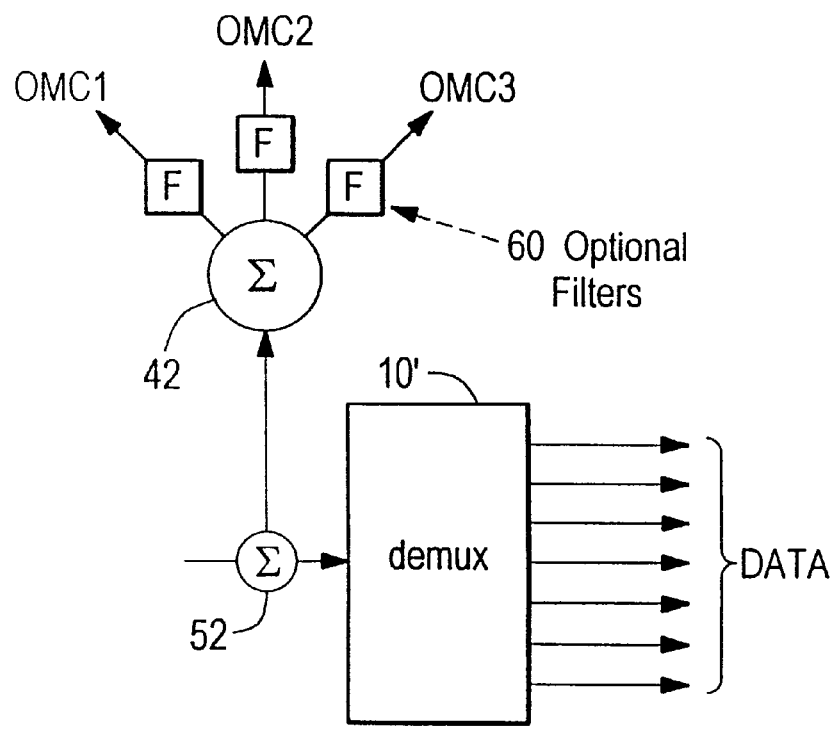

FIGS. 5 through 12 illustrate various ways in which one or multiple OMCs can be coupled to and from an optical link. FIGS. 5 and 6 show the use of an upgrade port on the multiplexer or demultiplexer 10' for this purpose. FIGS. 7 and 8 show a similar configuration, except that couplers 40 and 42 are used to merge and de-merge multiple OMCs to/from the upgrade port. FIGS. 9 and 10 show the use of couplers 50 and 52, which may be balanced (i.e., 50/50) or unbalanced couplers. FIGS. 11 and 12 show the use of couplers 40 and 42 to merge and demerge multiple OMCs, along with couplers 50 and 52 to insert and extract the OMCs to/from the fiber. FIG. 12 also shows that it may be desirable to include filters 60 on the respective paths for the OMCs to improve signal quality.

Figure 13:
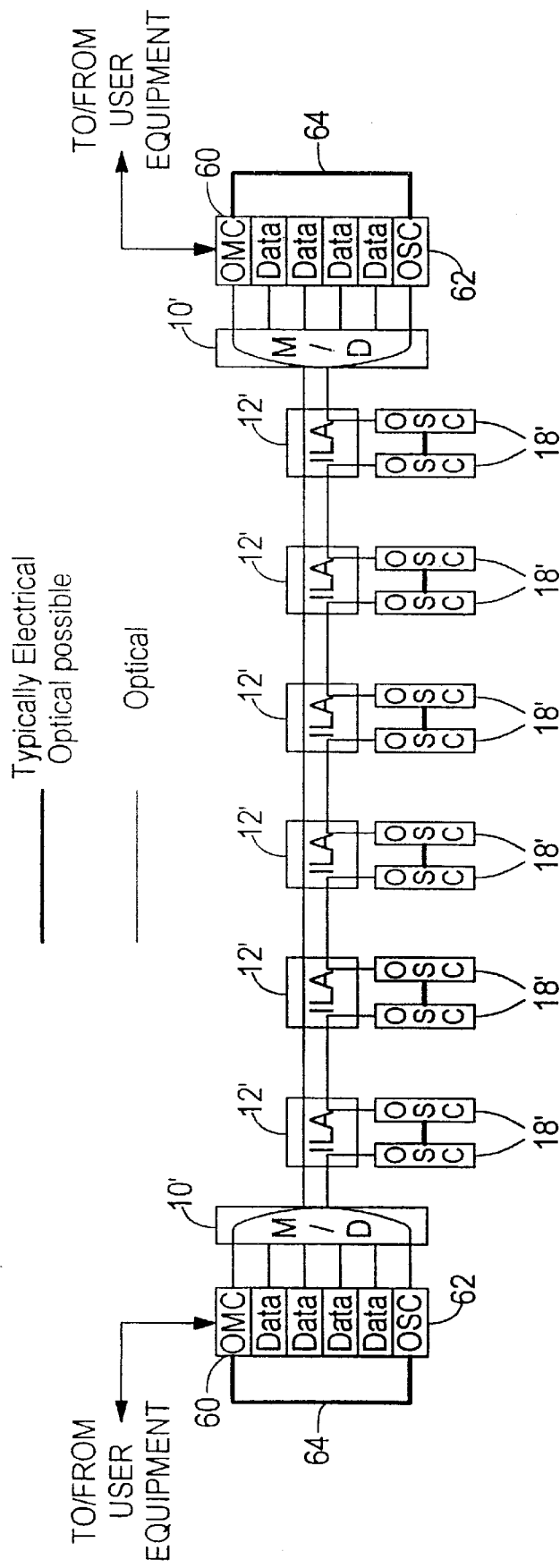
FIG. 13 shows a DWDM system having a protected management ring using an optical supervisory channel (OSC) and an OMC.

FIG. 13 shows how an OMC and an OSC can be combined to form a Management Channel Ring in order to improve failure tolerance. At each inline node 12', one or more processors (not shown) process the data on the OSC in each direction, extracts the data destined for that node, and forwards on data not destined for that node using a predetermined switching or routing protocol. For instance, the Internet Protocol (IP) may be used as a forwarding engine at each node. A protocol from layer 2 of the well-known 7-layer Open Systems Interconnect (OSI) model may also be used.

FIG. 13 shows that there is a connection between an "east" OSC interface and a "west" OSC interface at each node 12' to facilitate this data forwarding. Typically this connection is electrical, although it may alternatively be optical. The connection may exist on a single card, or it may be an interconnection between cards. In addition, the forwarding engine(s) may exist on these cards or on different card(s).

Similarly, the OSC and the OMC are interconnected at the end nodes. OMC interface circuitry 60 is connected to OSC interface circuitry 62 by a high-speed interconnection 64, which may also be either electrical or optical. The combination of an OSC and OMC and the interconnection of the OSC and OMC at the intermediate and end nodes collectively form a ring network to carry the management traffic, even though the physical network is linear. This is in contrast to a linear control channel network, which would be formed if only an OSC were used.

Because rings are more robust to failures than linear networks (which are not robust to any failures), the use of an OMC facilitates a more robust control channel. For example, if the west OSC card were to fail at an in-line node in a linear network, all nodes to the west would be cut off, from a control channel perspective, from that node and all nodes to the east. However, in a ring network using an OMC such as shown in FIG. 13, complete connectivity would remain, because control traffic can traverse the ring in the other direction to reach a desired destination.

Any of a variety of protocols can be used for the control channel. For instance, FDDI or Token Ring protocols, which have been designed specifically for rings, could be used. IP over Ethernet might also be used. Other possibilities also exist, such as IP over SONET, 2-fiber UPSR or 2-fiber BLSR.

FIG. 13 also shows that the OMC interfaces 60 can have separate interfaces to external user equipment, for carrying user traffic on the OMC. It is preferred that this user interface conform to any of a variety of open standards, including Ethernet, Asynchronous Transfer Mode (ATM), High-Level Data Link Control (HDLC), Point-to-Point Protocol (PPP), Internet Protocol (IP), Transmission Control Protocol (TCP), User Datagram Protocol (UDP), the Open Shortest Path First (OSPF) routing protocol, and Multi-Protocol Label Switching (MPLS).

Although the illustrated embodiment employs optical fibers carrying optical signals in one direction only, it will be understood that the disclosed technique can also be used in systems having fibers carrying optical signals in both directions, i.e., in the so-called "red" and "blue" bands, and in systems having both "work" and "protect" fibers carrying signals in opposite directions for redundancy purposes. Additionally, the techniques described herein are applicable to more arbitrary network topologies. For example, there may be one or more optical add/drop multiplexers along a path between the multiplexers/demultiplexers, which may add and drop one or more OMCs while allowing one or more other OMCs to pass through. The OMCs generally are terminated at locations where waves are terminated. An in-band optical management channel for wavelength-division multiplexed systems has been shown. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. In an optical network, a node, comprising:
   transmitting optical communications equipment comprising:
   a management optical channel interface; and
   a transmitter for transmitting a wavelength-division multiplexed (WDM) optical communications signal coupled with said optical management channel interface;
   wherein said (WDM) optical communications signal comprises a plurality of spaced-apart optical signals including in-band data optical signals and at least one in-band management optical signal occupying an unused in-band channel, and said management optical signal is a first management optical signal carrying network management traffic for a first network management domain, and wherein said WDM optical signal includes one or more additional management optical signals each carrying network management traffic for a respective one of additional network management domains.

2. The node according to claim 1, wherein said transmitting optical communications equipment comprises a coupler operative to combine said management optical signals, and wherein said combined management optical signals are added to said WDM optical signal using an upgrade port of an optical multiplexer.

3. The node according to claim 1, wherein said transmitting optical communications equipment includes a coupler operative to combine the management optical signals, and wherein said combined management optical signals are added to said WDM optical signal using a broadband coupler.

4. In an optical network, a node, comprising:
   transmitting optical communications equipment comprising:
   a management optical channel interface; and
   a transmitter for transmitting a wavelength-division multiplexed (WDM) optical communications signal coupled with said optical management channel interface;
   wherein said WDM optical communications signal comprises a plurality of spaced-apart optical signals including in-band data optical signals and at least one in-band management optical signal occupying an unused in-band channel, and an optical communications link and said transmitting optical communications equipment are included in a first network management domain, and further comprising additional optical communications equipment communicatively coupled with said transmitting optical communications equipment for communicating over said optical communications link, said additional optical communications equipment being included in one or more additional network management domains apart from said first network management domain and utilizing said management optical signal for network management communications.

5. The node according to claim 4, wherein said management optical signal is a first management optical signal carrying network management traffic for a first network management domain, and wherein said WDM optical signal also includes one or more additional management optical signals each carrying network management traffic for a respective one of additional network management domains.

6. The node according to claim 4, wherein management optical signal interface in said transmitting optical communications equipment comprises a user interface having network layer functionality to enable user traffic to be carried on a management ring.

7. In an optical network, a method of transmitting optical signals, comprising:

transmitting a wavelength-division multiplexed (WDM) optical communications signal comprising a plurality of spaced-apart optical signals including in-band data optical signals; and transmitting a WDM optical communications signal comprising at least one in-band management optical signal occupying ar. unused in-band channel;

wherein said transmitting step comprises the step of transmitting said management optical signal as a first management optical signal carrying network management traffic for a first network management domain, and further transmitting one or move additional management optical signals within said WDM optical signal each carrying network management traffic for a respective one of additional network management domains.

8. The method according to claim 7, wherein said transmitting step comprises the step of combining said management optical signals with a coupler and adding said combined management optical signals to said WDM optical signal using an upgrade port of an optical multiplexer.

9. The method according to claim 7, wherein said transmitting step comprises the step of combining said management optical signals with a coupler and adding said combined management optical signals to said WDM optical signal using a broadband coupler.

10. In an optical network, a method of transmitting optical signals, comprising:

transmitting a wavelength-division multiplexed (WDM) optical communications signal comprising a plurality of spaced-apart optical signals including in-band data optical signals; and transmitting a WDM optical communications signal comprising at least one in-band management optical signal occupying an unused in-band channel;

wherein said transmitting step comprises the step of transmitting in a first network management domain, and further comprising additional optical communications equipment communicatively coupling with said transmitting optical communications equipment and communicating over an optical communications link, said additional optical communications equipment being included in one or more additional network management domains apart from said first network management domain and utilizing said management optical signal for network management communications.

11. The method according to claim 10, wherein said transmitting step comprises the step of transmitting said management optical signal as a first management optical signal carrying network management traffic for a first network management domain, and said WDM optical signal further including one or more additional management optical signals each carrying network management traffic for a respective one of additional network management domains.

12. The method according to claim 10, wherein said transmitting step comprises the step of transmitting said management optical signal using a user interface having network layer functionality enabling transmitting user traffic carried on a management ring.

* * * * *